(12) United States Patent
Nakahara

(10) Patent No.: US 6,418,531 B1
(45) Date of Patent: Jul. 9, 2002

(54) PROCESSOR, LOOP PROGRAM CONTROL DEVICE AND MULTIPROCESSOR SYSTEM

(75) Inventor: Makoto Nakahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/262,332

(22) Filed: Mar. 4, 1999

(30) Foreign Application Priority Data

Mar. 4, 1998 (JP) .......................................... 10-052369

(51) Int. Cl.[7] .............................................. G06F 15/16
(52) U.S. Cl. .................................................... 712/241
(58) Field of Search ........................ 712/241; 711/214, 711/217, 218, 219, 220

(56) References Cited

U.S. PATENT DOCUMENTS

| | | | | |
|---|---|---|---|---|
| 5,226,128 A | * | 7/1993 | Rau et al. ................... | 712/241 |
| 5,287,509 A | * | 2/1994 | Yamada ...................... | 709/107 |
| 5,355,462 A | * | 10/1994 | Rousseau et al. ........... | 711/215 |
| 5,375,238 A | * | 12/1994 | Ooi ............................. | 711/241 |
| 5,524,223 A | * | 6/1996 | Lazaravich et al. ......... | 712/241 |
| 5,712,999 A | * | 1/1998 | Guttag et al. ............... | 711/211 |
| 5,765,218 A | * | 6/1998 | Ozawa et al. ............... | 711/219 |

* cited by examiner

*Primary Examiner*—William M. Treat
(74) *Attorney, Agent, or Firm*—Staas & Halsey LLP

(57) ABSTRACT

A processor which can execute a loop program including a loop instruction includes an addressing unit which generates a data address with which data can be read from a memory during execution of the loop instruction. The data address includes information indicative of which loop of a loop process defined by the loop instruction should be executed. The information forms part of the data address.

16 Claims, 18 Drawing Sheets

(1) : PROGRAM SEQUENCE CONTROL SIGNAL
(2) : PROGRAM COUNTER VALUE
(3) : RESULT OF DECODING INSTRUCTION
(4) : NUMBER OF LOOPS IN LOOP INSTRUCTION
(5) : SIGNAL INDICATING (2) IS ADDRESS OF JUMP DESTINATION
(6) : LEADING ADDRESS OF LOOP EXECUTED BY EACH PROCESSOR
(7) : SIGNAL INDICATING PROCESSOR ASSOCIATED WITH ADDRESS BEING OUTPUT
(8) : SIGNAL INDICATING WHICH LOOP
(9) : BUSY SIGNAL FROM EACH PROCESSOR

FIG. 2 PRIOR ART

| | | |
|---|---|---|
| 0TH-LOOP EXECUTION | label1: | LD(00h)+, R0<br>LD(04h)+, R1<br>ADD R0, R1<br>ST R1, (80h)+<br>LOOP 4, label1 |
| 1ST-LOOP EXECUTION | label1: | LD(08h)+, R0<br>LD(0Ch)+, R1<br>ADD R0, R1<br>ST R1, (84h)+<br>LOOP 3, label1 |
| 2ND-LOOP EXECUTION | label1: | LD(10h)+, R0<br>LD(14h)+, R1<br>ADD R0, R1<br>ST R1, (88h)+<br>LOOP 2, label1 |
| 3RD-LOOP EXECUTION | label1: | LD(18h)+, R0<br>LD(1Ch)+, R1<br>ADD R0, R1<br>ST R1, (8Ch)+<br>LOOP 1, label1 |
| 4TH-LOOP EXECUTION | label1: | LD(20h)+, R0<br>LD(24h)+, R1<br>ADD R0, R1<br>ST R1, (90h)+<br>LOOP 0, label1 |

FIG. 3 PRIOR ART

| 0TH-LOOP EXECUTION BY PROCESSOR (0) | LD(00h), R0<br>LD(04h), R1<br>ADD R0, R1<br>ST R1, (80h) | • LOAD DATA FROM ADDRESS (00h) AND STORE THE DATA IN R0<br>• LOAD DATA FROM ADDRESS (04h) AND STORE THE DATA IN R1<br>• STORE RESULT OF R1+R0 IN R1<br>• STORE DATA OF R1 IN ADDRESS (80h) |
|---|---|---|
| 1ST-LOOP EXECUTION BY PROCESSOR (1) | LD(08h), R0<br>LD(0Ch), R1<br>ADD R0, R1<br>ST R1, (84h) | • LOAD DATA FROM ADDRESS (08h) AND STORE THE DATA IN R0<br>• LOAD DATA FROM ADDRESS (0Ch) AND STORE THE DATA IN R1<br>• STORE RESULT OF R1+R0 IN R1<br>• STORE DATA OF R1 IN ADDRESS (84h) |
| 2ND-LOOP EXECUTION BY PROCESSOR (2) | LD(10h), R0<br>LD(14h), R1<br>ADD R0, R1<br>ST R1, (88h) | • LOAD DATA FROM ADDRESS (10h) AND STORE THE DATA IN R0<br>• LOAD DATA FROM ADDRESS (14h) AND STORE THE DATA IN R1<br>• STORE RESULT OF R1+R0 IN R1<br>• STORE DATA OF R1 IN ADDRESS (80h) |
| 3RD-LOOP EXECUTION BY PROCESSOR (3) | LD(18h), R0<br>LD(1Ch), R1<br>ADD R0, R1<br>ST R1, (8Ch) | • LOAD DATA FROM ADDRESS (18h) AND STORE THE DATA IN R0<br>• LOAD DATA FROM ADDRESS (1Ch) AND STORE THE DATA IN R1<br>• STORE RESULT OF R1+R0 IN R1<br>• STORE DATA OF R1 IN ADDRESS (8Ch) |
| 4TH-LOOP EXECUTION BY PROCESSOR (4) | LD(20h), R0<br>LD(24h), R1<br>ADD R0, R1<br>ST R1, (90h) | • LOAD DATA FROM ADDRESS (20h) AND STORE THE DATA IN R0<br>• LOAD DATA FROM ADDRESS (24h) AND STORE THE DATA IN R1<br>• STORE RESULT OF R1+R0 IN R1<br>• STORE DATA OF R1 IN ADDRESS (90h) |

FIG. 5

| BASE ADDRESS | OFFSET ADDRESS | MEMORY MAP |
|---|---|---|
| 00h | 00~FFh | FOR LOOP0 |
| 01h | 00~FFh | FOR LOOP1 |
| 02h | 00~FFh | FOR LOOP2 |
| 03h | 00~FFh | FOR LOOP3 |
| 04h | 00~FFh | FOR LOOP4 |
|  |  | RESERVED |
| 80h | 00~FFh | FOR STORE |
|  |  | RESERVED |

DATA ADDRESS 16 UPPER BITS = BASE ADDRESS
DATA ADDRESS 16 LOWER BITS = OFFSET ADDRESS

FIG. 6

| 0TH-LOOP EXECUTION | label1: | LD 0(AR0), R0<br>LD 0(AR1), R1<br>ADD R0, R1<br>ST R1, BR0(loop<<2)<br>newLOOP label1 | EXECUTED BY PROCESSOR 1<br><br>LOOP INSTRUCTION OF THE INVENTION |
|---|---|---|---|
| 1ST-LOOP EXECUTION | label1: | LD 0(AR0), R0<br>LD 0(AR1), R1<br>ADD R0, R1<br>ST R1, BR0(loop<<2)<br>newLOOP label1 | EXECUTED BY PROCESSOR 1<br><br>LOOP INSTRUCTION OF THE INVENTION |
| 2ND-LOOP EXECUTION | label1: | LD 0(AR0), R0<br>LD 0(AR1), R1<br>ADD R0, R1<br>ST R1, BR0(loop<<2)<br>newLOOP label1 | EXECUTED BY PROCESSOR 2<br><br>LOOP INSTRUCTION OF THE INVENTION |
| 3RD-LOOP EXECUTION | label1: | LD 0(AR0), R0<br>LD 0(AR1), R1<br>ADD R0, R1<br>ST R1, BR0(loop<<2)<br>newLOOP label1 | EXECUTED BY PROCESSOR 3<br><br>LOOP INSTRUCTION OF THE INVENTION |
| 4TH-LOOP EXECUTION | label1: | LD 0(AR0), R0<br>LD 0(AR1), R1<br>ADD R0, R1<br>ST R1, BR0(loop<<2)<br>newLOOP label1 | EXECUTED BY PROCESSOR 4<br><br>LOOP INSTRUCTION OF THE INVENTION |

FIG. 7

| | | | |
|---|---|---|---|
| 0TH-LOOP EXECUTION | label1: | MOV 0, AR0<br>LD loop(AR0)+, R0<br>LD loop(AR0)+, R1<br>ADD R0, R1<br>ST R1, BR0(loop<<2)<br>newLOOP label1 | EXECUTED BY PROCESSOR 1<br><br>LOOP INSTRUCTION OF THE INVENTION |
| 1ST-LOOP EXECUTION | label1: | MOV 0, AR0<br>LD loop(AR0)+, R0<br>LD loop(AR0)+, R1<br>ADD R0, R1<br>ST R1, BR0(loop<<2)<br>newLOOP label1 | EXECUTED BY PROCESSOR 1<br><br>LOOP INSTRUCTION OF THE INVENTION |
| 2ND-LOOP EXECUTION | label1: | MOV 0, AR0<br>LD loop(AR0)+, R0<br>LD loop(AR0)+, R1<br>ADD R0, R1<br>ST R1, BR0(loop<<2)<br>newLOOP label1 | EXECUTED BY PROCESSOR 2<br><br>LOOP INSTRUCTION OF THE INVENTION |
| 3RD-LOOP EXECUTION | label1: | MOV 0, AR0<br>LD loop(AR0)+, R0<br>LD loop(AR0)+, R1<br>ADD R0, R1<br>ST R1, BR0(loop<<2)<br>newLOOP label1 | EXECUTED BY PROCESSOR 3<br><br>LOOP INSTRUCTION OF THE INVENTION |
| 4TH-LOOP EXECUTION | label1: | MOV 0, AR0<br>LD loop(AR0)+, R0<br>LD loop(AR0)+, R1<br>ADD R0, R1<br>ST R1, BR0(loop<<2)<br>newLOOP label1 | EXECUTED BY PROCESSOR 4<br><br>LOOP INSTRUCTION OF THE INVENTION |

(1): PROGRAM SEQUENCE CONTROL SIGNAL
(2): PROGRAM COUNTER VALUE
(3): RESULT OF DECODING INSTRUCTION
(4): NUMBER OF LOOPS IN LOOP INSTRUCTION
(5): SIGNAL INDICATING (2) IS ADDRESS OF JUMP DESTINATION
(6): LEADING ADDRESS OF LOOP EXECUTED BY EACH PROCESSOR
(7): SIGNAL INDICATING PROCESSOR ASSOCIATED WITH ADDRESS BEING OUTPUT
(8): SIGNAL INDICATING WHICH LOOP
(9): BUSY SIGNAL FROM EACH PROCESSOR

VALID : INDICATE LOOP PROGRAM TO BE EXECUTED.
WHEN VALID IS ACTIVE, SELECTOR SELECTS LOOP ADDRESS AND WRITING INTO REGISTER INDICATING LOOP NUMBER IS PERFORMED.

FIG. 13

| BASE ADDRESS | OFFSET ADDRESS | | |
|---|---|---|---|
| LOOP NUMBER OF LOOP OF LOOP PROCESS IN LOOP INSTRUCTION (UPPER) | 0 | 0 | OFFSET 2 (PROCESSOR 0) |
| LOOP NUMBER OF LOOP OF LOOP PROCESS IN LOOP INSTRUCTION (UPPER) | 0 | 1 | OFFSET 2 (PROCESSOR 1) |
| LOOP NUMBER OF LOOP OF LOOP PROCESS IN LOOP INSTRUCTION (UPPER) | 1 | 0 | OFFSET 2 (PROCESSOR 2) |
| LOOP NUMBER OF LOOP OF LOOP PROCESS IN LOOP INSTRUCTION (UPPER) | 1 | 1 | OFFSET 2 (PROCESSOR 3) |

↑
OFFSET 1 (2 LOWER BITS)

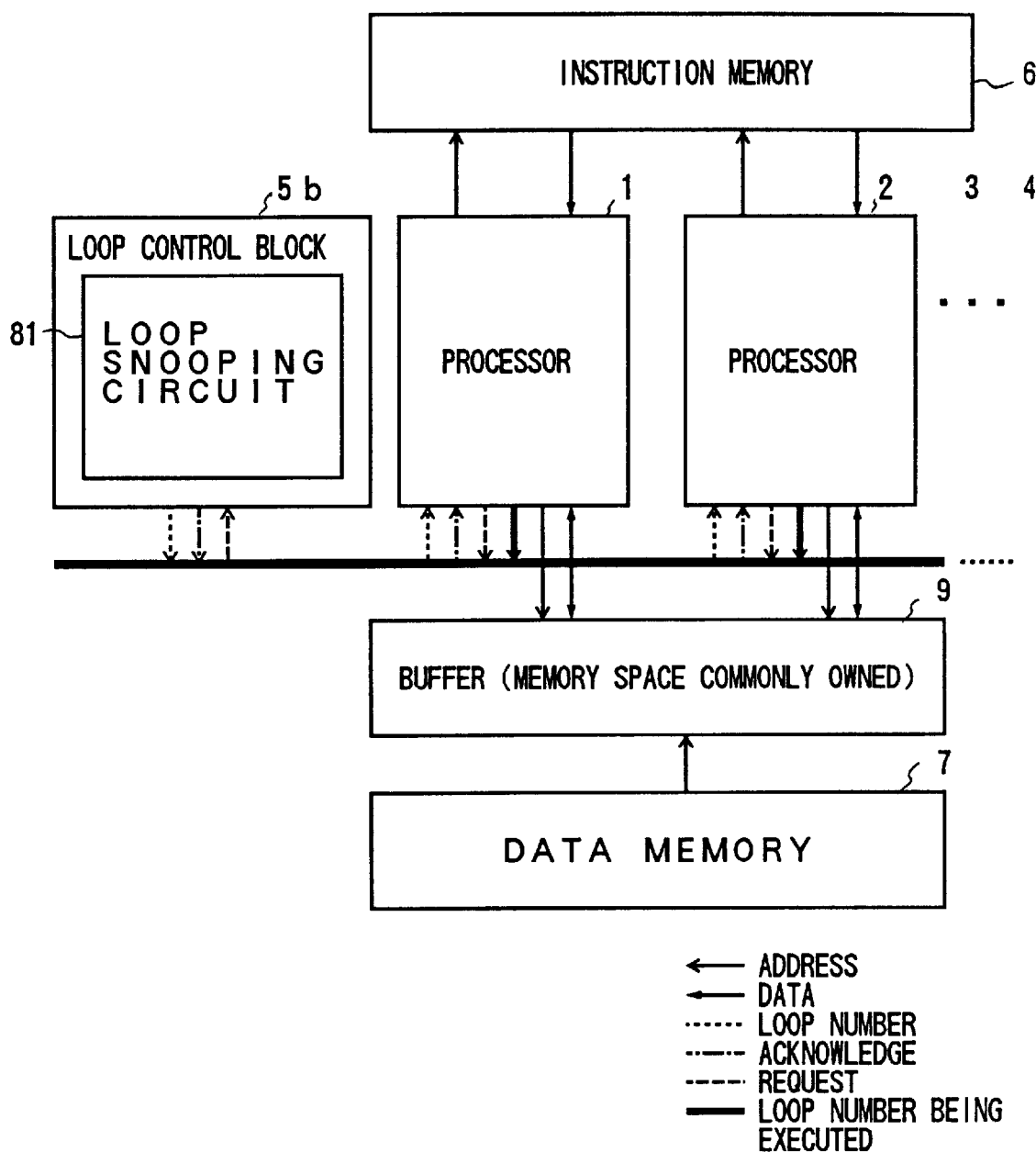

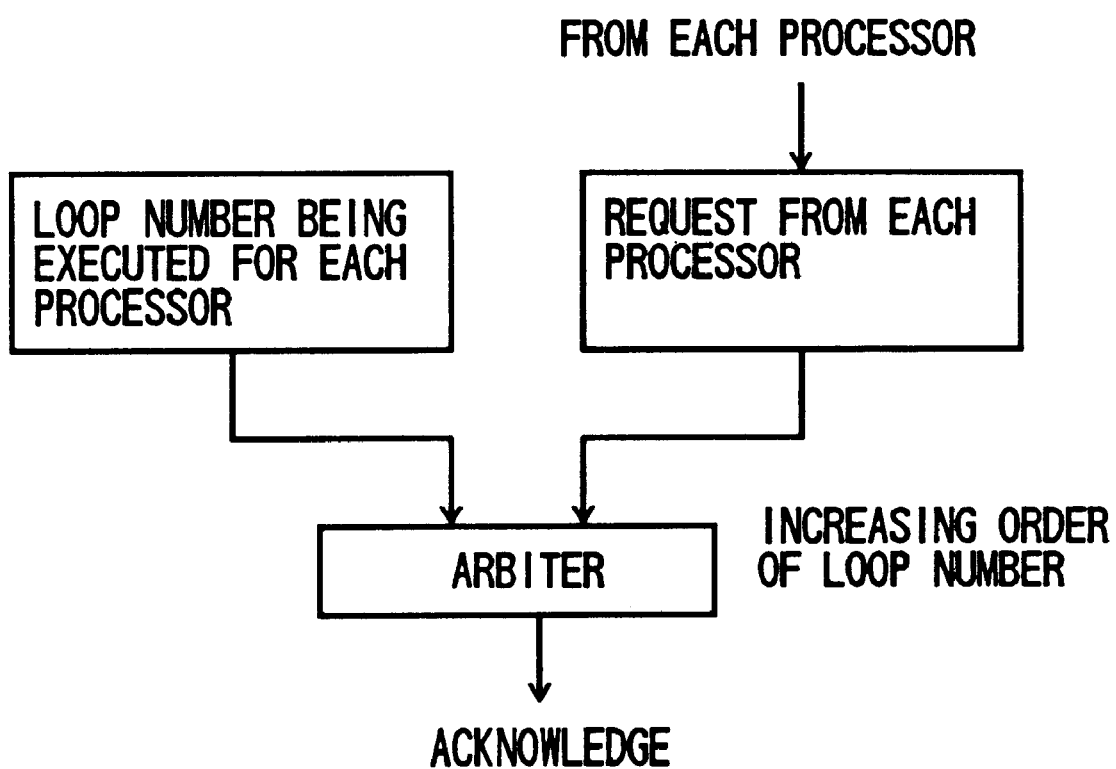

PROCESSOR, LOOP PROGRAM CONTROL DEVICE AND MULTIPROCESSOR SYSTEM

BACKGROUND OF THE INVENTION

1. Field of the Invention

The present invention relates to a processor which can execute a loop program having a loop instruction including a repetitive access to data stored in a memory, and a loop program control device which can execute a control to make a plurality of processors execute, in parallel, respective loops of a loop process of a loop instruction. Further, the present invention is concerned with a multiprocessor system which includes a plurality of processors and a loop program control device as described above.

Recently, it has been required to execute high-speed, high-performance processing in a computer. Such a requirement can be achieved by parallel processing of instructions or the like.

A typical method related to the parallel process of instructions executed by processors is a multiprocessor system capable of executing programs by a plurality of processors in a parallel fashion.

2. Description of the Related Art

A description will be given of a conventional single processor system which executes a loop program including a loop instruction including a repetitive access to data stored in a memory, and a conventional multiprocessor system.

As an example of the loop program including the loop instruction, a description will be given of a case where the following program is executed by a conventional single processor system or a conventional multiprocessor system.

|        | MOV 0, AR0     | instruction #1 |
|--------|----------------|----------------|
|        | MOV 80, AR1    | instruction #2 |
| labell: | LD (AR0)+, R0 | instruction #3 |
|        | LD (AR0)+, R1  | instruction #4 |
|        | ADD R0, R1     | instruction #5 |
|        | ST R1, (AR1)+  | instruction #6 |
|        | LOOP 4, labell | instruction #7 |

The above loop program is a program that includes a loop instruction and repetitive access to data stored in a memory.

The loop program has an initial setting in which an immediate value of 00h (h denotes hexadecimal notation) written into an AR0 register (instruction #1), and an immediate value of 80h is written into an AR1 register (instruction #2).

Instruction #3 loads data to an R0 register from address 00h indicated by the AR0 register, and increments AR0 after the loading. That is, 04h is written into the AR0 register. The data consists of 32 bits. Instruction #4 loads data to an R1 register from address 04h indicated by the AR0 register, and increments AR0 after the loading. That is, 08h is stored in the AR0 register. The data consists of 32 bits.

Instruction #5 stores the result of an adding operation on R0 and R1 in the R1 register.

Instruction #6 stores data in the R1 register in a memory area indicated by address 80h stored in the AR1 register, and then updates the address by incrementing it. That is, the incremented address in the register AR1 becomes 84h. The data consists of 32 bits.

Instruction #7 jumps execution of instructions to labell and causes instructions #3–#7 to be repeatedly executed until a variable num becomes equal to 4 (num=4). The variable num has an initial value of 0, and is incremented each time the process is jumped by the loop instruction LOOP.

The above loop program including the loop instruction is executed by the conventional single processor or the conventional multiprocessor system as follows. A data memory space for the loop program is configured as shown in FIG. 1. More particularly, the data memory space includes a read (load) data area related to the zeroth-loop execution of the loop process to the fourth-loop execution thereof, and a write (store) data area. The read data area is accessed by data addresses 0000h–0024h, and the write data area is accessed by data addresses 0080h–0093h.

The loop instruction LOOP is executed by the single processor, as shown in FIG. 2. The single processor system time-serially executes respective loops of the loop process four times (the zeroth-loop execution to the fourth-loop execution). The single processor accesses the memory space shown in FIG. 1 each time a loop of the loop process is executed.

The loop instruction LOOP can also be executed by the multiprocessor system, as shown in FIG. 3. As shown in FIG. 3, the loop process of the loop instruction LOOP is separated into the respective loop processes by a compiler, and the processors execute the respective loops in parallel. In this case, the loops executed by the respective processors are assigned to areas of an instruction memory that are accessible by the processors at the time of compiling. For example, in FIG. 3, processor (0) is involved with the zeroth-loop execution of the loop process, and processor (1) is involved with the first-loop execution thereof. Similarly, processor (2) is involved with the second-loop execution of the loop process, and processor (3) is involved with the third-loop execution thereof. Further, processor (4) is involved with the fourth-loop execution of the loop instruction. The process of the loop instruction is separated into the respective loops by the compiler, and the respective loops are assigned to the processors. Hence, it is not necessary to serially execute the loop processors. Thus, the branch instruction LOOP is not needed.

The conventional multiprocessor system has high performance when the processors respectively execute different programs. However, the conventional multiprocessor system does not have high performance when a single program is segmented and executed.

More particularly, the conventional multiprocessor system employs a scheduling method in order to process the program including the loop instruction in parallel. At the time of compiling, the loop process of the loop instruction of the program is separated into the respective loops, and the processors are respectively scheduled to execute the loops. In other words, the processors are scheduled to be assigned to the respective accessible instruction memory areas. Hence, the conventional multiprocessor system is required to store the program for each of the loops and thus has a huge memory area. This increases the cost in practice.

SUMMARY OF THE INVENTION

It is a general object of the present invention to eliminate the above disadvantages.

A more specific object of the present invention is to provide a multiprocessor system capable of executing a loop process in a program in parallel by processors without an increased memory area.

Another object of the present invention is to provide a processor and a loop program control device applicable to the above-mentioned multiprocessor system.

The above objects of the present invention are achieved by a processor which can execute a loop program including a loop instruction, the processor comprising: an addressing unit which generates a data address with which data can be read from a memory during execution of the loop instruction, the above data address including information indicative of which loop of a loop process defined by the loop instruction should be executed; the information forming part of the data address. As has been described previously, the prior art multiprocessor system separates a loop process of a loop instruction into respective loops, which are then stored in a memory. Hence, the prior art multiprocessor system needs an extremely large memory space. In contrast, the present invention makes it possible for the processor to recognize which loop of the loop process should be executed. Hence, it is no longer required to separate the loop process of the loop instruction into the respective loop processes defined thereby. The present invention loads the loop program stored in an instruction memory and recognizes which loop of the loop process should be executed. In this case, data to be processed can be obtained by the data address including the information indicative of which loop of the loop process should be executed.

The above objects of the present invention are also achieved by a processor which can execute a loop program including a loop instruction, the processor comprising: an addressing unit which generates a data address with which data can be read from a memory during execution of the loop instruction, the above data address including information indicative of which loop of a loop process defined by the loop instruction should be executed, the information forming part of the data address; and an increment unit which automatically updates the information after the loop is executed; the updated information forming part of the data address so that a next data address can be generated.

The processor may be configured so that: the updated information indicates a number of times loops of the loop process that have been executed; the processor further comprises a comparator unit which determines whether the number of loops indicated by the updated information exceeds a given number of loops; and the loop process continues to be executed until the number of loops indicated by the updated information exceeds the given number of loops.

The above objects of the present invention are also achieved by a loop program control device adapted to a multiprocessor system having a master processor and slave processors, the loop program control device comprising: a leading address detection unit which detects a leading address of a loop program when the master processor executes the loop program; a detection unit which detects a total number of loops of a loop process defined by a loop instruction included in the loop program that should be executed; a first notification unit which notifies the processors of the leading address detected by the leading address detection unit; and a second notification unit which notifies each of the processors of information indicating which loop of the loop process should be executed. Hence, it is possible to recognize the number of processors required to execute the parallel processing of the loop program. Each of the processors thus recognized is notified of which one of the loops should be executed, namely, which times of the loop process should be executed. Hence, the parallel processing can easily be realized.

The above loop program control device may further comprise: a snooping unit which monitors whether the master and slave processors can execute the loop instruction in parallel; and a loop count unit which counts up or down, each time the second notification unit notifies one of the processors of the information, a count value which is related to a number of loops of the loop process that have been executed. Hence, it is possible to easily identify processors which can be involved with the parallel processing of the loop program.

The above objects of the present invention are also achieved by a multiprocessor system comprising: processors capable of executing loops of a loop process defined by a loop instruction included in a loop program, each of the processors comprising an addressing unit which generates a data address with which data can be read from a memory during execution of the loop instruction, the above data address including information indicative of which loop of the loop process defined by the loop instruction should be executed; and a loop program control device which controls the same number of processors as a number of loops of the loop process should repeatedly be executed so that the same number of processors executes the respective loops in parallel. As has been described previously, the prior art employs a compiler which separates the loop process of the loop program into respective loops, to which processors are respectively assigned by the scheduling method. Hence, the processors respectively use pre-computed and fixed data addresses. In contrast, the present invention employs the information indicative of which loop of the loop process should be executed by the respective processor. Hence, it is no longer required to separate the loop process of the loop program into the respective loops by a compiler. Hence, it is possible for the processors to access the same loop program stored in a memory.

The above multiprocessor system may be configured so that the loop program control device comprises: a leading address detection unit which detects a leading address of the loop program when one of the processors serving as a master processor executes the loop program; a detection unit which detects a total number of loops of the loop process that should be executed; a first notification unit which notifies the processors including processors serving as slave processors of the leading address detected by the leading address detection unit; and a second notification unit which notifies each of the processors of information indicating which loop of the loop process should be executed. By recognizing the total number of loops of the loop process which should be carried out, it is possible to identify the number of processors which should be involved with the parallel processing of the loop program or instruction. Then, the processors thus determined are supplied with the leading address of the loop program. Further, each of the processors is notified of which loop of the loop process should be handled. Hence, the multiprocessor system can realize parallel processing of the loop program without increasing the memory space.

The above multiprocessor system may be configured so that the loop program control device further comprises: a snooping unit which monitors whether the master and slave processors can execute the loop instruction in parallel; and a loop count unit which counts up or down, each time the second notification unit notifies one of the processors of the information, a count value which is related to a number of loops of the loop process that have been executed.

The multiprocessor system may be configured so that each of the processors comprises an addressing unit which generates a data address with which data can be read from a memory during execution of the loop instruction, the above data address including information indicative of which loop of the loop process defined by the loop instruction should be executed.

The multiprocessor system may be configured so that each of the processors comprises: an addressing unit which generates a data address with which data can be read from a memory during execution of the loop instruction, the above data address including information indicative of which loop of the loop process defined by the loop instruction should be executed; and an increment unit which automatically updates the information after the loop is executed, the updated information forming part of the data address so that a next data address can be generated.

The multiprocessor system may be configured so that: the updated information indicates the number of loops of the loop process that have been executed; the processor further comprises a comparator unit which determines whether the number of loops indicated by the updated information exceeds a given number of loops; and the loop process continues to be executed until the number of loops indicated by the updated information exceeds the given number of loops.

The multiprocessor system may further comprise: a buffer having a memory space accessed by the processors when the processors execute the loop instruction in parallel; and a snooping which monitors which loop of the loop process uses data input to the buffer from the memory and monitors which loop of the loop process is being executed for each of the processors, one of the processors which is executing the loop of the loop process which uses the data in the buffer being assigned a right to access the buffer.

The multiprocessor system may further comprise: a buffer having a memory space accessed by the processors when the processors execute the loop instruction in parallel; and a snooping unit which monitors which loop of the loop process is being executed for each of the processors, a right to access the buffer being serially given to the processors in the increasing order of loop numbers of the loops of the loop process which are being executed when the processors commonly use the data stored in the buffer and generate an identical data address.

The multiprocessor system may be configured so that when a specific one of the processors recognizes the loop instruction while executing the loop program, the processors including the above specific one of the processors execute the loops of the loop process defined by the loop instruction.

The above objects of the present invention are also achieved by a processor which can execute a loop program including a loop instruction, comprising: an addressing unit which generates a data address with which data can be read from a memory during execution of the loop instruction, the above data address including information indicative of which loops of a loop process defined by the loop instruction should be executed, the information forming part of the data address; and a decrement unit which automatically decrements a loop number of the above-mentioned loop after the loop is executed, the decrement unit adding information indicative of the decremented loop number to the data address so that a next data address can automatically be generated.

BRIEF DESCRIPTION OF THE DRAWINGS

Other objects, features and advantages of the present invention will become apparent from the following detailed description when read in conjunction with the accompanying drawings, in which:

FIG. 2 is a diagram showing an execution of the loop program by a single processor;

FIG. 3 is a diagram showing an execution of the loop program by a multiprocessor system;

FIG. 5 shows a data memory space related to loop programs (1) and (2) described in the specification;

FIG. 6 is a diagram showing an execution of loop program (1) by the multiprocessor system of the present invention;

FIG. 7 is a diagram showing an execution of loop program (2) by the multiprocessor system of the present invention;

FIGS. 13 show yet another addressing of the processor;

FIG. 17 shows an operation of the loop control block; and

FIG. 18 is a block diagram of yet another multiprocessor system of the present invention.

DESCRIPTION OF THE PREFERRED EMBODIMENTS

A description will now be given of a multiprocessor system of the present invention by referring to the accompanying drawings.

Figure 1:
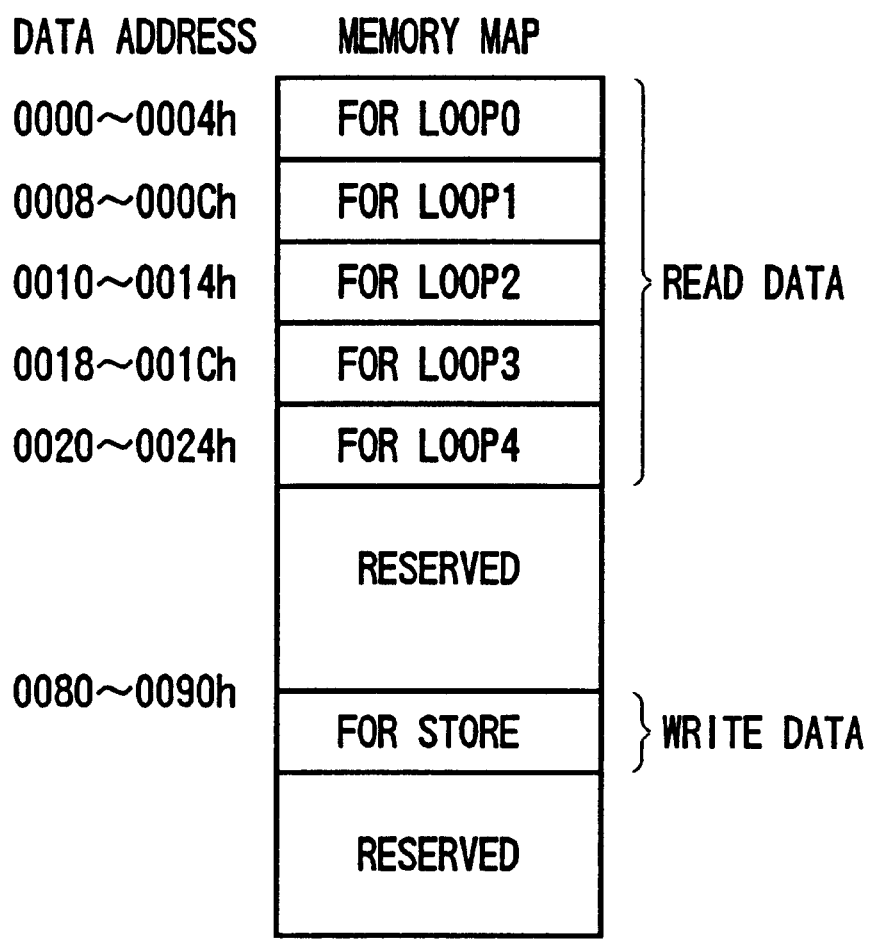
FIG. 1 is a diagram showing a data memory space used when a loop program is executed by a conventional manner.
Figure 4:
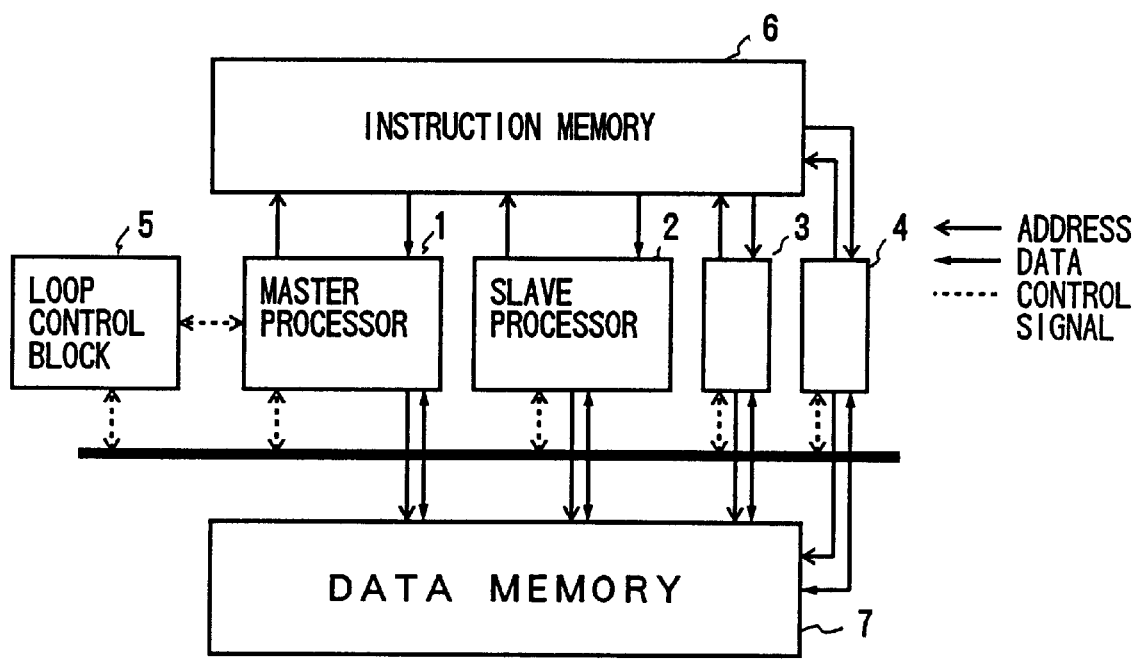
FIG. 4 is a block diagram of a multiprocessor system according to the present invention.

FIG. 4 is a block diagram of a multiprocessor system according to an embodiment of the present invention. The multiprocessor system shown in FIG. 4 includes a master processor 1, slave processors 2, 3 and 4, a loop control block 5, an instruction memory 6 and a data memory 7. The processors 1–4 can execute a loop program that includes a loop instruction and an instruction which accesses data stored in the data memory 7. The loop control block 5 performs a control to make the processors 1–4 execute, in parallel, respective loops of a loop process of the loop instruction in the loop program executed by the master processor 1. Although the multiprocessor system shown in FIG. 4 has four processors, the present invention is not limited thereto but can include an arbitrary number of processors.

The following loop programs (1) and (2) are shown below as examples of a loop program including a loop instruction and an instruction which accesses data in the data memory 7. The loop programs (1) and (2) are stored in the instruction memory 6 and are read by the processors.

| Loop program (1): | | |
|---|---|---|
| | MOV 0, AR0 | instruction #1 |
| | MOV 04, AR1 | instruction #2 |
| | MOV 80, BR0 | instruction #3 |
| label1: | LD loop(AR0), R0 | instruction #4 |
| | LD loop(AR1), R1 | instruction #5 |
| | ADD R0, R1 | instruction #6 |
| | ST R1, BR0(loop<<2) | instruction #7 |
| | LOOP 4, label1 | instruction #8 |

The loop program (1) includes a loop instruction LOOP (instruction #8) and instructions which access data stored in the data memory 7 (instructions #4–#5).

The loop program (1) has an initial setting in which an immediate value of 00h (h denotes hexadecimal notation) is written into an AR0 register (instruction #1), and an immediate value of 04h is written into an AR1 register (instruction #2). Further, an immediate value of 80h is written into a BR0 register (instruction #3).

Instruction #4 loads 32-bit data from a memory area of the data memory 7 specified by a combined data address to the R0 register. The above combined data address is a combination of a base address indicated by "loop" (indicating the ith loop process where i is 0, 1, 2, 3 or 4 in the example of concern, in other words, indicating which loop of the loop process is involved with instruction #4) and an offset address 00h indicated by the AR0 register (see FIG. 5).

Instruction #5 loads 32-bit data from a memory area of the data memory 7 specified by a combined data address to the R1 register. The combined data address is a combination of the base address indicated by "loop" (indicating which loop of the loop process is involved herewith) and an offset address 04h indicated by the AR1 register.

Instruction #6 stores the result of an adding operation on R0 and R1 in the R1 register.

Instruction #7 loads the data in the R1 register to a memory area specified by a combined data address, which is a combination of a base address 80h indicated by the BR0 register and an offset address (indicating which loop of the loop process is involved herewith) indicated by "loop". An expression "loop<<2" denotes a two-bit leftward shift for accomplishing a word address formation.

Instruction #8 jumps execution of instructions to label1 and causes instructions #4–#8 to be repeatedly executed until a variable num becomes equal to 4 (num=4). The variable num has its initial value of 0, and is incremented each time the process is jumped by the loop instruction LOOP. Loop program (2):

| Loop program (2): | | |
|---|---|---|
| | MOV 80, BR0 | instruction #11 |
| label1: | MOV 0, AR0 | instruction #12 |
| | LD loop(AR0)+, R0 | instruction #13 |
| | LD loop(AR0)+, R1 | instruction #14 |
| | ADD R0, R1 | instruction #15 |
| | ST R1, BR0(loop<<2) | instruction #16 |
| | LOOP 4, label1 | instruction #17 |

The loop program (2) includes a loop instruction LOOP (instruction #17) and access to data stored in the data memory 7 (instructions #13–#14).

The loop program (2) has an initial setting in which an immediate value of 80h (h denotes hexadecimal notation) is written into a BR0 register (instruction #11), and an immediate value of 00h is written into an AR0 register (instruction #12).

Instruction #13 loads 32-bit data from a memory area of the data memory 7 specified by a combined data address to the R0 register. The above combined data address is a combination of the base address indicated by "loop" (indicating which loops of the loop process is involved herewith) and an offset address indicated by the AR0 register. After the loading, the address in the AR0 register is incremented and thus becomes equal to 04h.

Instruction #14 loads 32-bit data from a memory area of the data memory 7 specified by a combined data address to the R1 register. The combined data address is a combination of the base address indicated by "loop" (indicating which loops of the loop process is involved herewith) and the offset address 04h indicated by the AR0 register. After the loading, the address in the AR0 register is incremented and thus becomes equal to 08h.

Instruction #15 stores the result of an adding operation on R0 and R1 in the R1 register.

Instruction #16 stores data from a memory area of the data memory 7 specified by a combined data address to the R1 register. The combined data address is a combination of the base address 80h indicated by the BR0 register and the offset address indicated by "loop" (indicating which loop of the loop process is involved herewith). An expression "loop<<2" denotes a two-bit leftward shift for accomplishing a word address formation.

Instruction #17 jumps execution of instructions to label1 and causes instructions #12–#17 to be repeatedly executed until the variable num becomes equal to 4 (num=4). As described before, the variable num has an initial value of 0, and is incremented each time the process is jumped by the loop instruction LOOP.

The loop program (1) or (2) can be executed by the multiprocessor system shown in FIG. 4 as follows. In this case, the data memory 7 is arranged as shown in FIG. 5. More particularly, the data memory space of the data memory 7 includes a read (load) data area related to the zeroth-loop execution of the loop process to the fourth-loop execution thereof, and a write (store) data area. The read data area is accessed by data addresses 0000h–04FFh, and the write data area is accessed by data addresses 8000h–80FFh.

When the loop instruction LOOP included in the loop program (1) is executed by the multiprocessor system, as shown in FIG. 6, the loop process of the loop instruction LOOP is separated into the respective loops, which are respectively executed by the processors 1–4 in parallel. Each of the loops executed by the respective processors 1–4 is executed by loading the loop program (1) stored in the instruction memory 6. For example, in the case shown in FIG. 6, the zeroth-loop execution of the loop process is handled by the processor 1, and the first-loop execution thereof is also handled by the processor 1. The second-loop execution of the loop process is handled by the processor 2, and the third-loop execution thereof is handled by the processor 3. Further, the fourth-loop execution of the loop process is handled by the processor 4.

The loop process of the loop instruction is separated into the respective loops, which are assigned to the processors 1–4. Hence, it is not necessary to serially execute the loops. Thus, the conventional branch instruction LOOP is not needed. However, instead of the conventional branch instruction LOOP, a new branch instruction "newLOOP" is used only for the zeroth-loop execution of the loop process. The branch instruction "newLOOP" drives a given circuit provided in the loop control block 5, which will be described later. The given circuit includes circuits which detect the address of labell (the leading address of the loop program (1)), detect the total number of loops of the loop process of the loop instruction that should be executed, and notify the processors 1–4 of the address of labell and information indicative of which loop of the loop process should be executed by the processors 1–4, respectively.

When the loop instruction LOOP included in the loop program (2) is executed by the multiprocessor system, as shown in FIG. 7, the loop process of the loop instruction LOOP is separated into the respective loops, which are respectively executed by the processors 1–4 in parallel. Each of the loops executed by the respective processors 1–4 is executed by loading the loop program (2) stored in the instruction memory 6. For example, in the case shown in FIG. 7, the zeroth-loop execution of the loop process is handled by the processor 1, and the first-loop execution thereof is also handled by the processor 1. The second-loop execution of the loop process is handled by the processor 2, and the third-loop execution thereof is handled by the processor 3. Further, the fourth-loop execution of the loop process is handled by the processor 4.

The loop process of the loop instruction is separated into the respective loops which are assigned to the processors 1–4. Hence, it is not necessary to serially execute the loops. Thus, the conventional branch instruction LOOP is not needed. As described before, instead of the conventional branch instruction LOOP, the new branch instruction "newLOOP" is used.

A description will now be given, with reference to FIG. 8, of operations of the multiprocessor system that are executed when the loop programs (1) and (2) are respectively executed.

The master processor 1 includes, as a program sequence control mechanism, a program counter 11, a master loop sequencer 12, a sequencer 13, and a data addressing unit 14. The program counter 11 is used to set the leading address of the loop program (1) or (2). The master loop sequencer 12 controls, as a master, execution of the loop program (1) or (2). The sequencer 13 performs an ordinary sequence control of the processors. The data addressing unit 14 generates, as a data addressing mechanism, a data address of the data memory 7.

Each of the slave processors 2, 3 and 4 includes a program counter 15, a slave loop sequencer 16, a sequencer 17 and a data addressing unit 18. The program counter 15 functions to set the leading address of the loop program (1) or (2) as a program sequence control mechanism. The slave loop sequencer 16 controls, as a slave, execution of the loop program (1) or (2). The sequencer 17 performs an ordinary sequence control of the processors. The data addressing unit 18 generates a data address of the data memory 7 as a data addressing mechanism.

Figure 9:
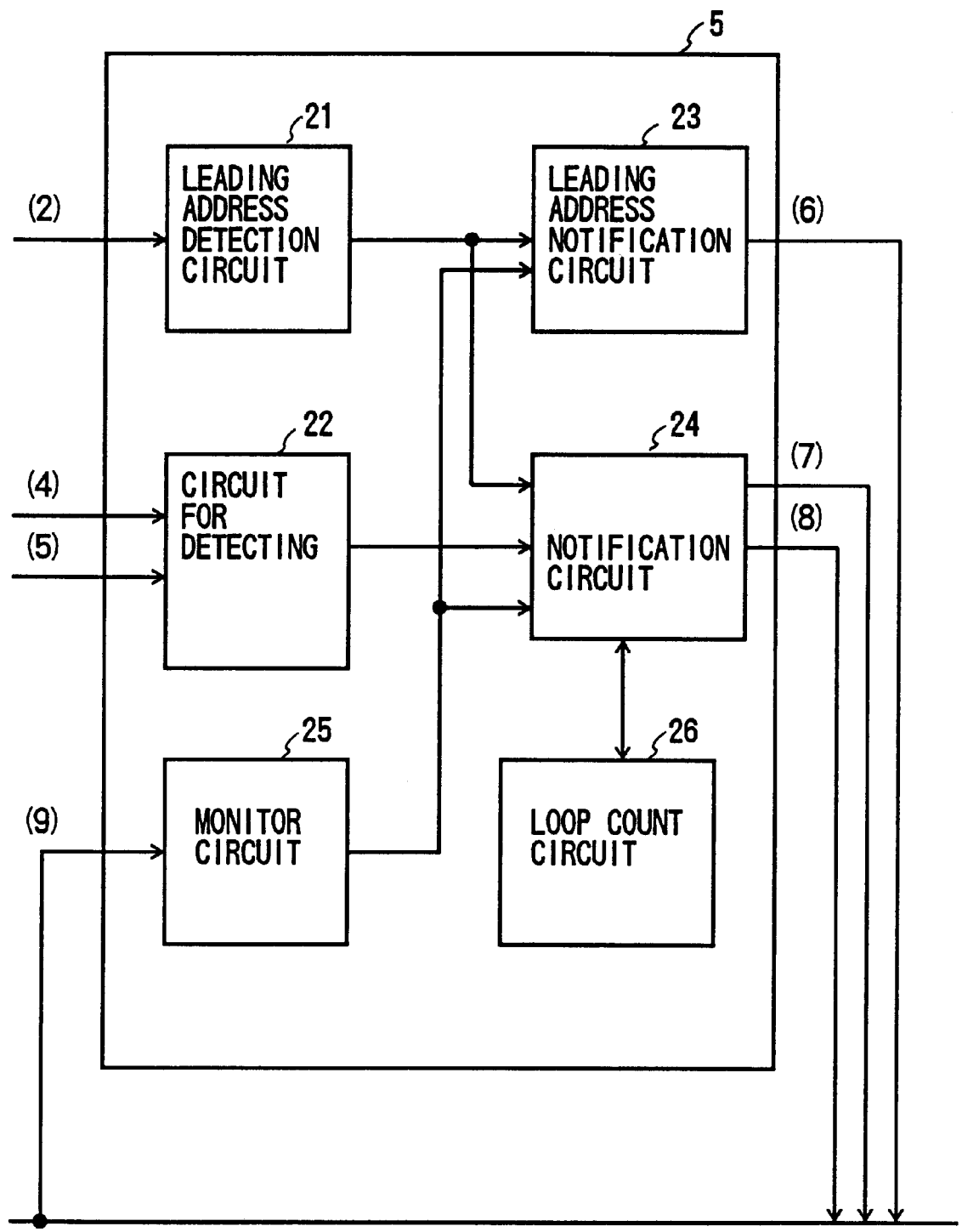
FIG. 9 is a block diagram of a structure of a loop control block.

As shown in FIG. 9, the loop control block of the microprocessor system includes a leading address detection circuit 21, a detection circuit 22, a leading address notification circuit 23, a notification circuit 24, a snooping circuit 25 and a loop count circuit 26. The leading address detection circuit 21 detects th& leading address (lavell) of the loop program. The detection circuit 22 detects the total number of loops of the loop process of the loop instruction that should be executed. The leading address notification circuit 23 notifies the processors of the address of the labell. The notification circuit 24 notifies the processors of information indicating the respective loops. The above information indicates which loop of the loop process should be executed. The snooping circuit 25 monitors processors which can execute the loop program. The loop count circuit 26 automatically counts up the count value each time the loop control block 5 notifies one of the processors of the respective loop to be executed. Thus, the count value indicates the number of loops of the loop process that have been executed. On the other hand, the loop count circuit 26 may be designed to automatically count down the count value each time the loop control block 5 notifies one of the processors of the respective loop to be executed.

The microprocessor system configured as described above executes the loop program (1) as follows. The sequencer 13 executes the ordinary sequence control of the processors. More particularly, the sequencer 13 fetches and decodes the loop program (1). The master loop sequencer 12 and the data addressing unit 14 are notified of the results obtained by decoding an instruction ((3) shown in FIG. 8). If the results obtained by decoding the instruction show that the program does not include any loop instruction, the sequencer 13 sets the leading address of the program to the program counter 11. The above setting is carried out by a program sequence control signal (1) in FIG. 8. Hence, the instructions can sequentially be executed without activating the loop control block 5.

Figure 8:
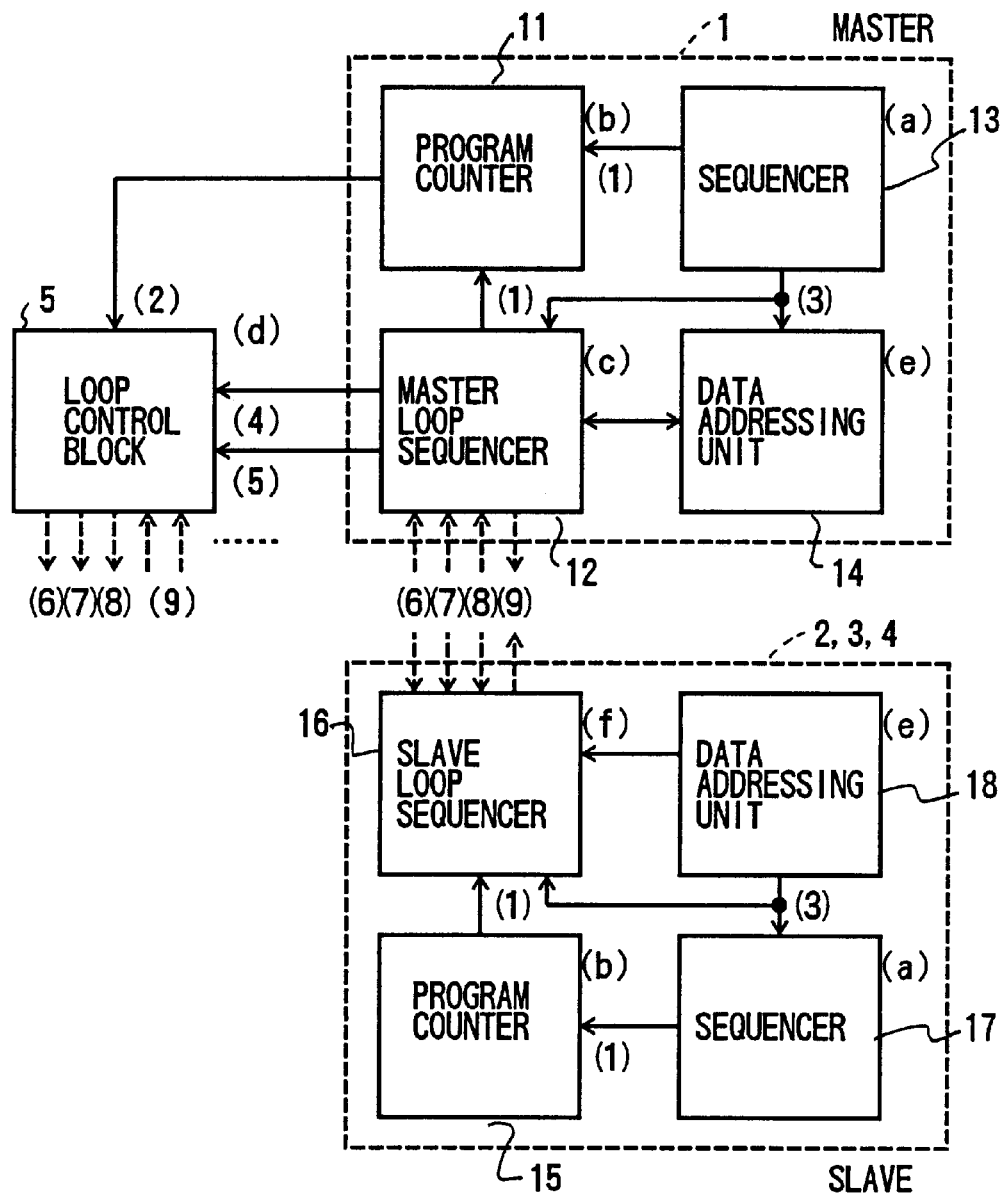
FIG. 8 is a block diagram showing a detailed structure of the multiprocessor system shown in FIG. 4.

When the master loop sequencer 12 receives, from the sequencer 13, the decoded results which show that a loop instruction is included in the loop program (1), the master loop sequencer 12 sets the leading address thereof to the program counter 11 ((1) in FIG. 8). Then, the master loop sequencer 12 notifies the loop control block 5 of the total number of loops of the loop process of the loop instruction included in the loop program (1) that should be executed.

After the leading address of the loop program (1) is set to the program counter 11, the master processor 1 executes the zeroth loop starting from the leading address, as shown in FIG. 6.

At that time (during execution of the zeroth loop), the leading address detection circuit 21 of the loop control block 5 detects the program counter value in the program counter 11 ((2) in FIG. 8). Here, the address of labell is detected. Then, the detection circuit 22 detects the total number of loops of the loop process of the loop instruction that should be executed ((4) in FIG. 8).

If the program counter value in progress of the loop program (1) indicates the address (labell) of the jump destination specified in the loop instruction, the master loop sequencer 12 notifies the loop control block 5 of a signal indicating that the program counter value (2) corresponds to the address of the jump destination of the loop instruction ((5) in FIG. 8).

After the loop control block 5 detects, during the zeroth-loop execution of the loop process, the number of loops of the loop process that should repeatedly be executed, the loop control block 5 recognizes the number of processors that are required to process the loop instruction in the loop program (1) in parallel. Further, the leading address notification circuit 23 notifies the same number of processors as the number of loops of the loop process that should be executed of the address of labell ((6) in FIG. 8).

The notification circuit 24 of the loop control block 5 provides the sequencers 12 and 16 with a signal indicating the processors to be supplied with the address of labell ((7) in FIG. 8), and notifies the sequencers 12 and 16 of information indicating which respective loops of the loop process should be executed by the processors which are informed of the address of labell ((8) in FIG. 8).

The processors are simultaneously notified of the address of the labell by the leading address notification circuit 23, because the same program is loaded to the processors which should execute the respective loops of the loop process of the loop program (1). However, the processors are time-serially informed of the respective loops to be executed because the processors execute different loops. Hence, the count value of the loop count circuit 26 is counted up or incremented each time one processor is notified of which loop of the loop process is to be executed. Hence, the processors which should execute the loop instruction can time-serially be informed of the respective loops to be executed.

As described above, the loop control block performs the control to have the processors execute the respective loops of the loop process included in the loop program (1) in parallel.

The processors which receive information items (6), (7) and (8) respectively execute the loops so that these processors download the same loop program (1) stored in the instruction memory 6. For example, as shown in FIG. 6, the first-loop execution of the loop process is handled by the master processor 1, and the second-loop execution thereof is handled by the slave processor 2. Similarly, the third-loop execution of the loop process is handled by the slave processor 3, and the fourth-loop execution of the loop process is handled by the slave processor 4.

The processors which are executing the loop program (1) in parallel output the respective busy signals which show that the processors are in progress. Before the leading address notification circuit 23 notifies the same number of processors as the number of loops of the loop process that should be carried out of the address of the labell ((6) in FIG. 8), the snooping circuit 25 monitors the busy signals from the processors in order to recognize which processors can execute the loop program (1).

The aforementioned loop program (2) is executed by the multiprocessor system shown in FIG. 4 in the same manner as the loop program (1), and a description thereof will be omitted here.

A description will now be given, with reference to FIGS. 10, 11A, 11B, 12A and 12B, of internal operations of the processors 1, 2, 3 and 4 in the multiprocessor system shown in FIG. 4, when these processors simultaneously execute the loops of the loop process included in the loop program (1) or (2) in parallel.

Figure 10:
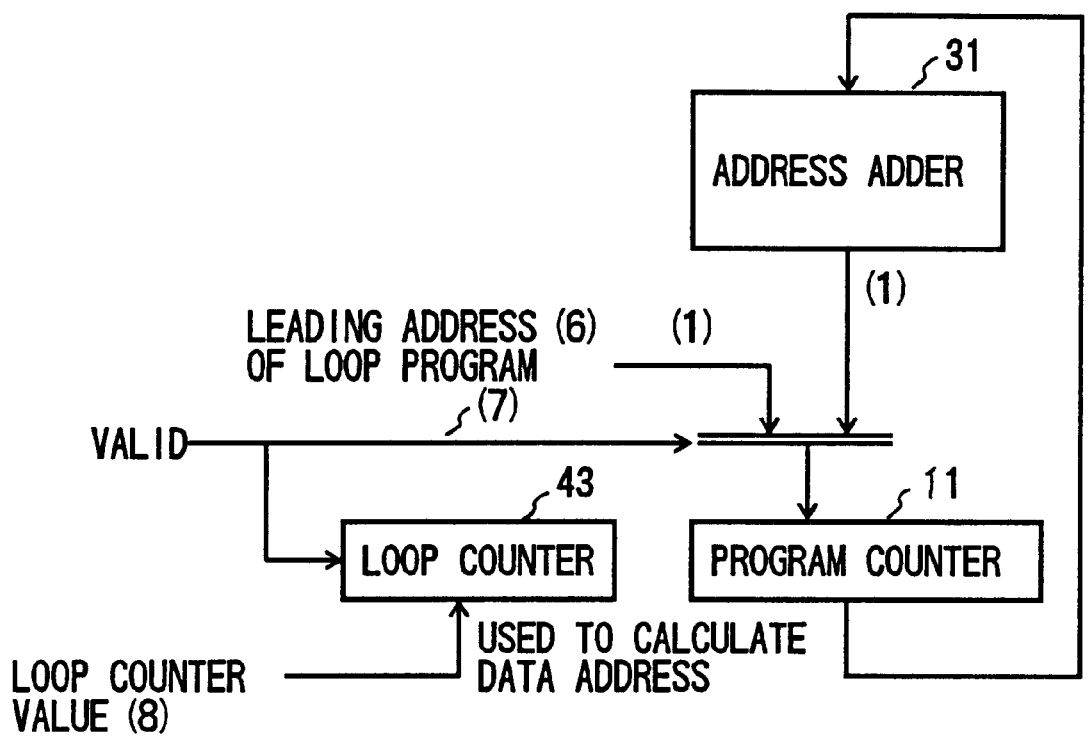
FIG. 10 is a diagram showing an operation of a processor of the present invention.

FIG. 10 shows the principle of the operation of each of the processors 1–4. For the sake of convenience, the following description is related to the internal operation of the master processor 1. However, the slave processors 2, 3 and 4 operate in the same manner as the master processor 1.

When the master processor 1 handles the first-loop execution of the loop process in the loop program (1), in other words, when the signal (7) shown in FIG. 8 from the notification circuit 24 is valid, the leading address of the loop program (1), that is, the address of labell, is set to the program counter 11 of the master processor 1.

Then, the master processor 1 serially performs the first-loop execution of the loop process starting from the address of labell. The address in the program counter 11 is automatically incremented by an address adder 31 provided in the sequencer 13.

Similarly, the second-loop, third-loop and fourth-loop executions of the loop process in the loop program (1) are simultaneously performed by the slave processors 2, 3 and 4.

Figure 11A:
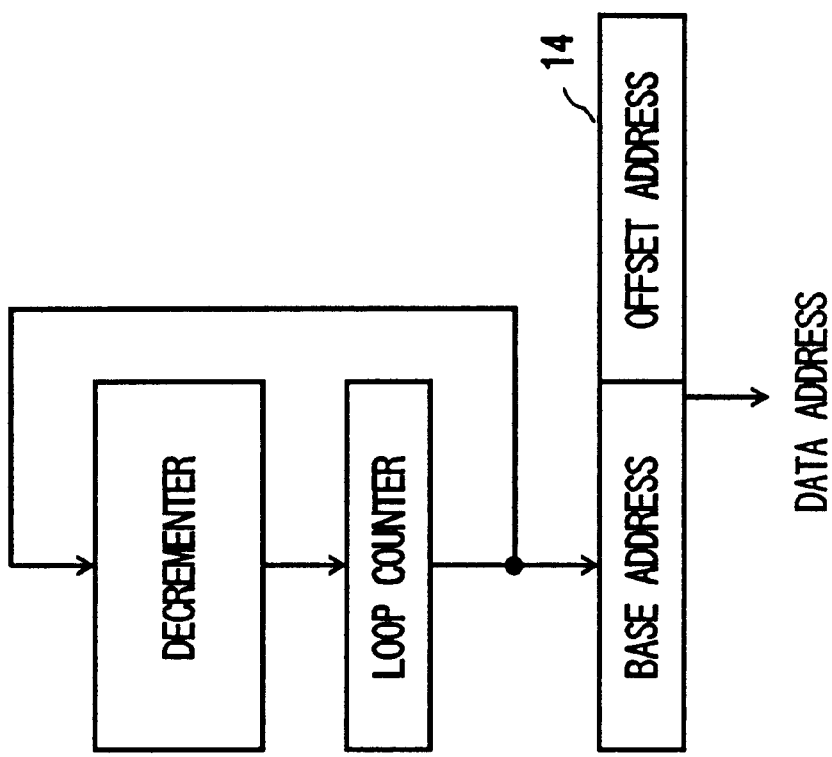
FIGS. 11A and 11B show addressing of the processor.
Figure 11B:
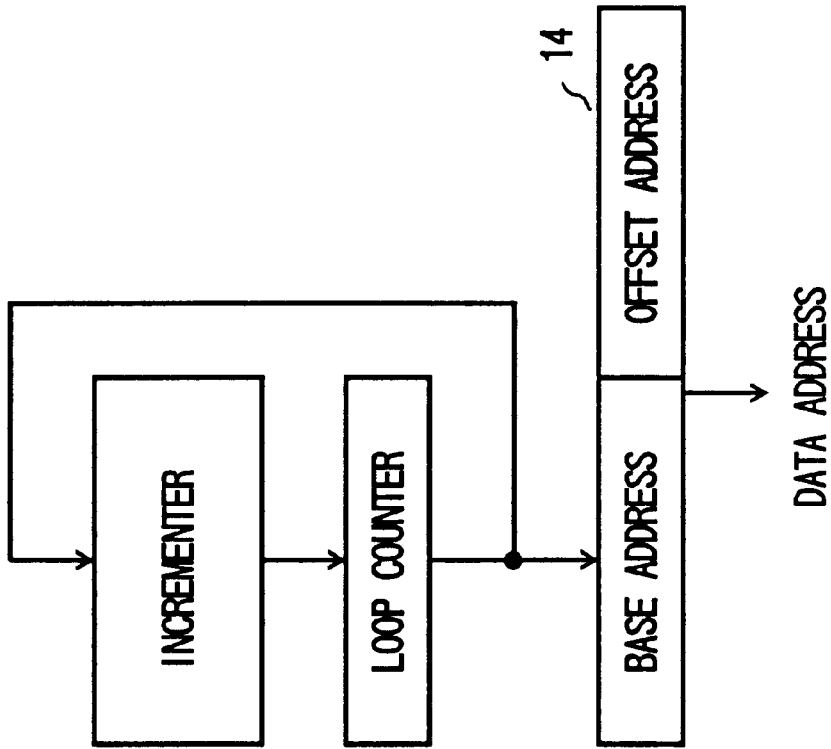

The master processor 1 includes the data addressing unit 14, which is configured as shown in FIGS. 11A and 11B or FIGS. 12A and 12B. In the configuration shown in FIGS. 11A and 11B, the base address is the information indicating a loop number of the loop of that the loop process that should be executed, and is added, as upper bits of the data address, to the offset address which serves as lower bits thereof. The configurations shown in FIGS. 11A and 11B differ from each other in that an incrementer and a decrementer are respectively used. For example, since all of the processors 1–4 should be involved with parallel execution of the loops of the loop process in the loop program (1) or (2), the loop counter shown in FIG. 11A or 11B is incremented or decremented by +1 three times.

Figure 12B:
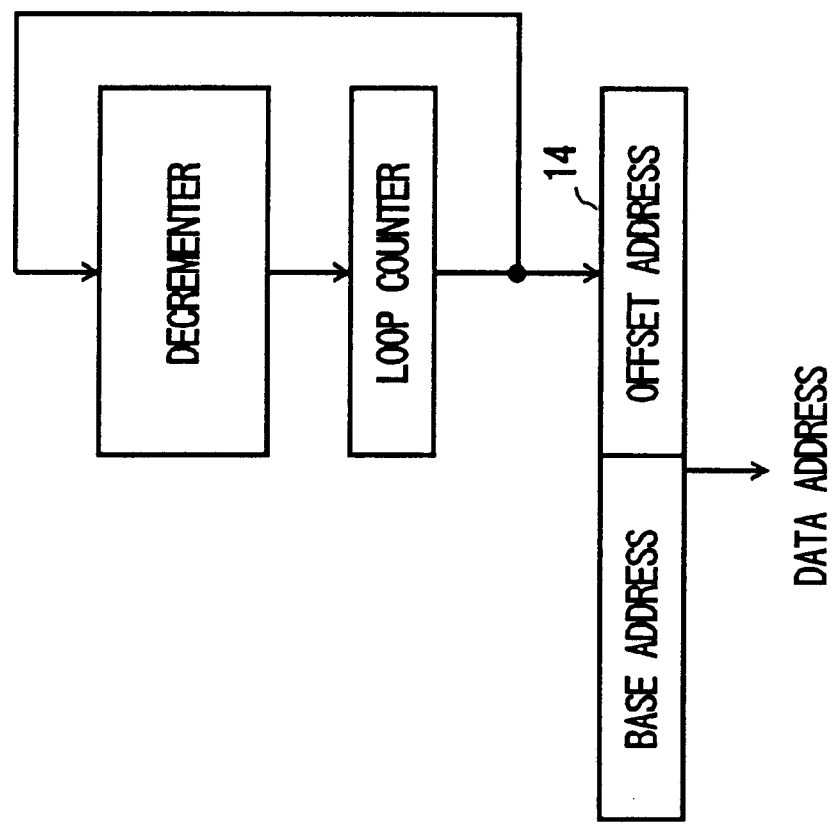
FIGS. 12A and 12B show another addressing of the processor.
Figure 12A:
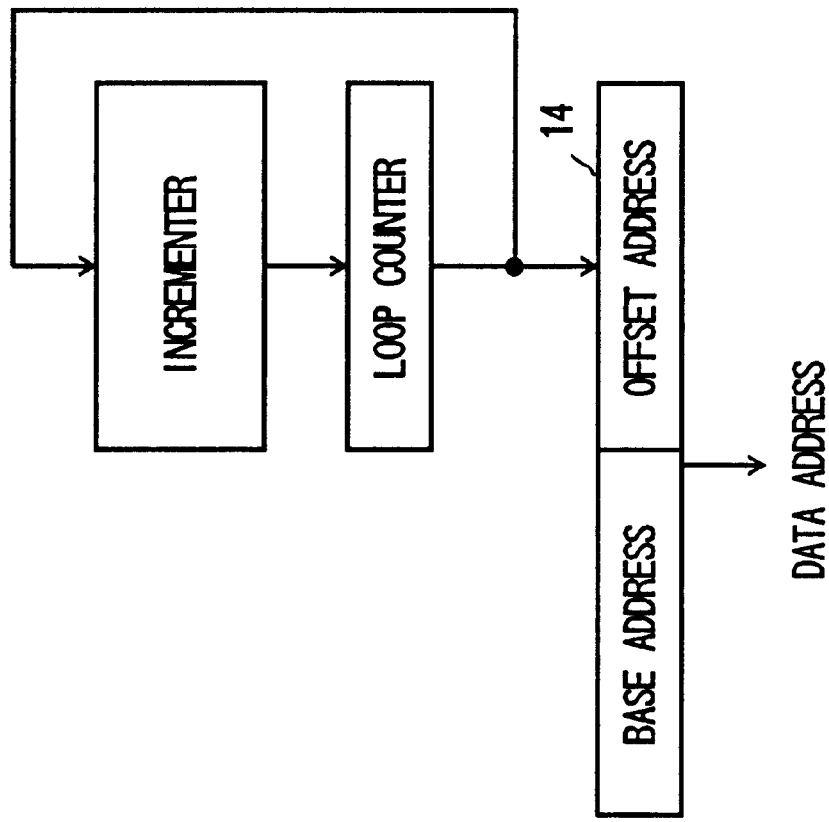

In the configuration shown in FIGS. 12A and 12B, the offset address is the information indicating a loop number of the loop of the loop process that should be executed, and is added, as lower bits of the data address, to the base address which serves as upper bits thereof. The configurations shown in FIGS. 12A and 12B differ from each other in that an incrementer and a decrementer are respectively used. For example, since all of the processors 1–4 should be involved with parallel execution of the loops of the loop process in the loop program (1) or (2), the loop counter shown in FIG. 11A or 11B is incremented or decremented by +1 three times.

The master processor 1 employs any of the addressing method shown in FIG. 11A in which the base address is automatically incremented, the addressing method shown in FIG. 11B in which the base address is automatically decremented, the addressing method shown in FIG. 12A in which the offset address is automatically incremented and the addressing method shown in FIG. 12B in which the offset address is automatically decremented.

Hence, the processors download the same (single) loop instruction of the loop program (1) or (2) stored in the instruction memory 6, while the data addresses related to the respective loops of the loop process executed by the processors can automatically be generated.

Alternatively, it is possible to employ an addressing method shown in FIG. 13 other than those shown in FIGS. 11A, 11B, 12A and 12B.

Figure 14:
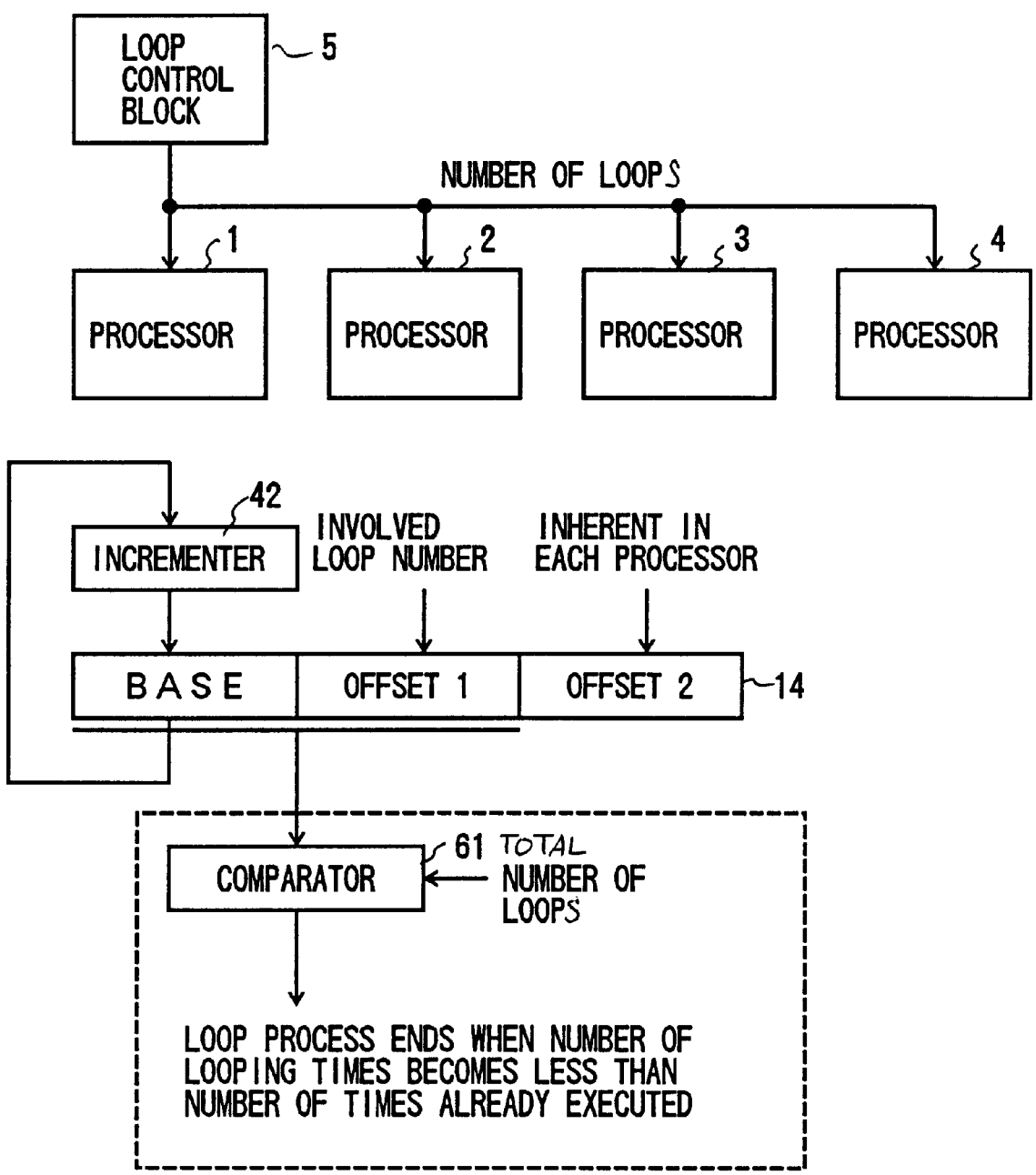
FIG. 14 is a block diagram of a configuration to which the addressing shown in FIG. 13 is applied.

The addressing method shown in FIG. 13 can be implemented by a configuration shown in FIG. 14. The configuration shown in FIG. 14 includes the data addressing unit 14 and an incrementer 42. More particularly, information which is supplied from the notification circuit 24 and which indicates which loop of the loop process should be executed forms the base address. The base address is added, as upper bits, to the offset address which is the subject of the data access prescribed in the loop program (1). Thus, the data address generated by the data addressing unit 14 includes the base address that is the upper address part and the offset address that is the lower address part. The incrementer 42 automatically increments the base address in accordance with the information indicating which loop of the loop process should be executed.

In each of the processors 1–4 configured as shown in FIG. 14, the data addressing unit 14 automatically generates the next data address by adding the base address, incremented by the incrementer according to the information indicates which loop is to be executed, to the offset address. Referring to FIG. 13, each of the four processors 1–4 recognizes, as being an offset 1 address, two bits immediately lower than the bits out of the bits indicating which loop of the loop process is to be carried out, and recognizes, as the base address, the upper bits. Further, another offset address which is the subject of the data access in the loop program (1) is added to the lower side of the offset 1. The above other offset will particularly be referred to as offset 2.

As shown in FIG. 13, the data address generated in the addressing method is assigned to the master processor 1 when offset 1 is '00', and is assigned to the slave processor 2 when offset 1 is '01'. Similarly, the data address is assigned to the slave processor 3 when offset 1 is '10', and is assigned to the slave processor 4 when offset 1 is '11'.

Hence, each of the processors can recognize which loop of the loop process should be executed, and can separately generate the data addresses from the loop program (1) stored in the instruction memory 6. Further, each of the processors can automatically increment the base address by the incrementer 42, and can execute a plurality of loops of the loop process.

In each of the processors is equipped with a comparator 61, which determines whether the loop number incremented by the incrementer 42 exceeds the total number of loops detected by the detection circuit 22. The loop process is continuously carried out until the incremented loop number exceeds the total number of loops.

Figure 15:
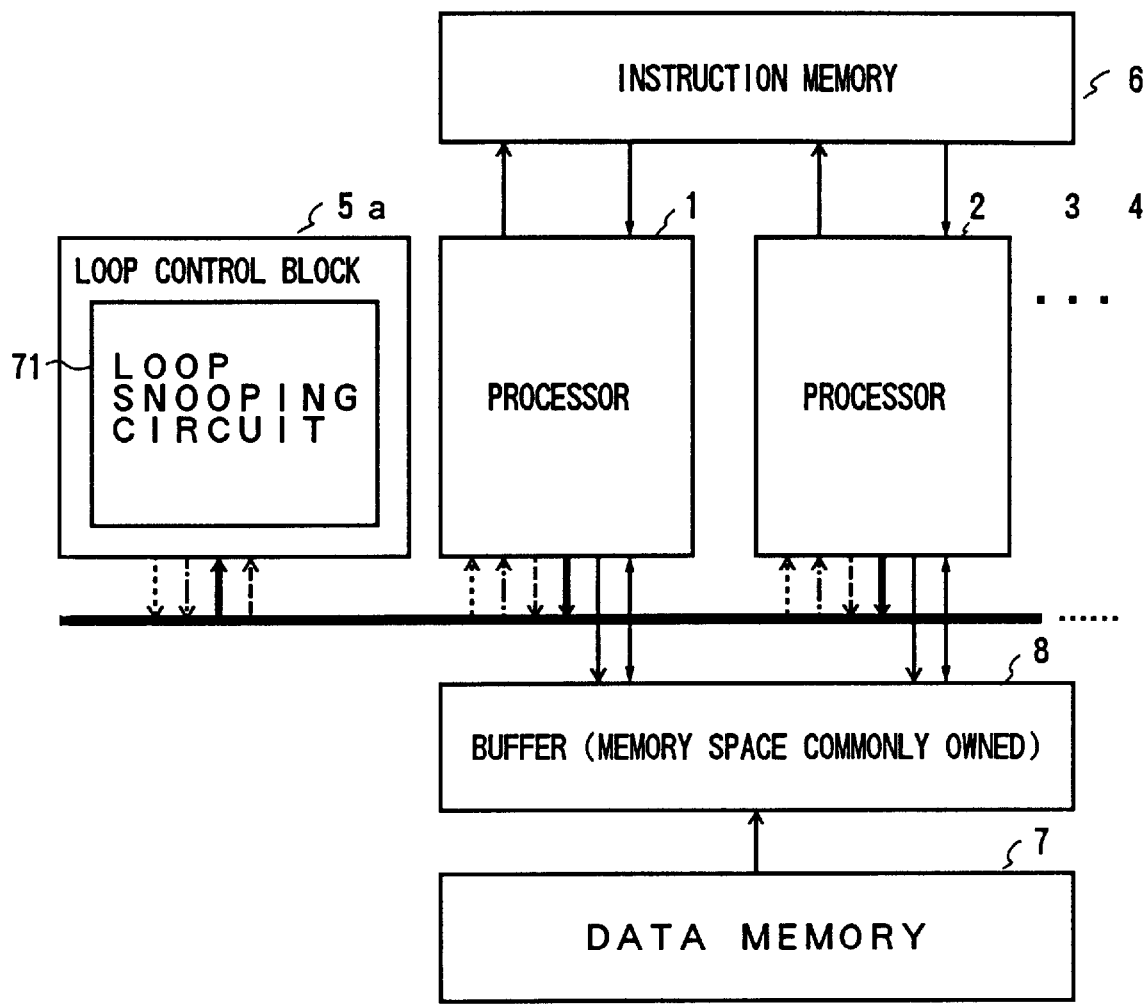
FIG. 15 is a block diagram of another multiprocessor system of the present invention.

FIG. 15 is a block diagram of another multiprocessor system according to the present invention. In FIG. 15, parts that are the same as those shown in the previously described drawings are given the same reference numbers.

The multiprocessor system shown in FIG. 15 includes the master processor 1, the slave processors 2–4, the instruction memory 6, the data memory 7, a buffer 8, and a loop control block 5a. The buffer 8 is provided to commonly use the data memory space by the processors when the processors execute the respective loops of the loop process of the loop program in parallel. The loop control block 5a is equipped with a loop snooping circuit 71, which monitors at which times of the loop process the data input to the buffer 8 from the data memory 7 is used and monitors which loop of the loop process each processor is executing.

Figure 16:
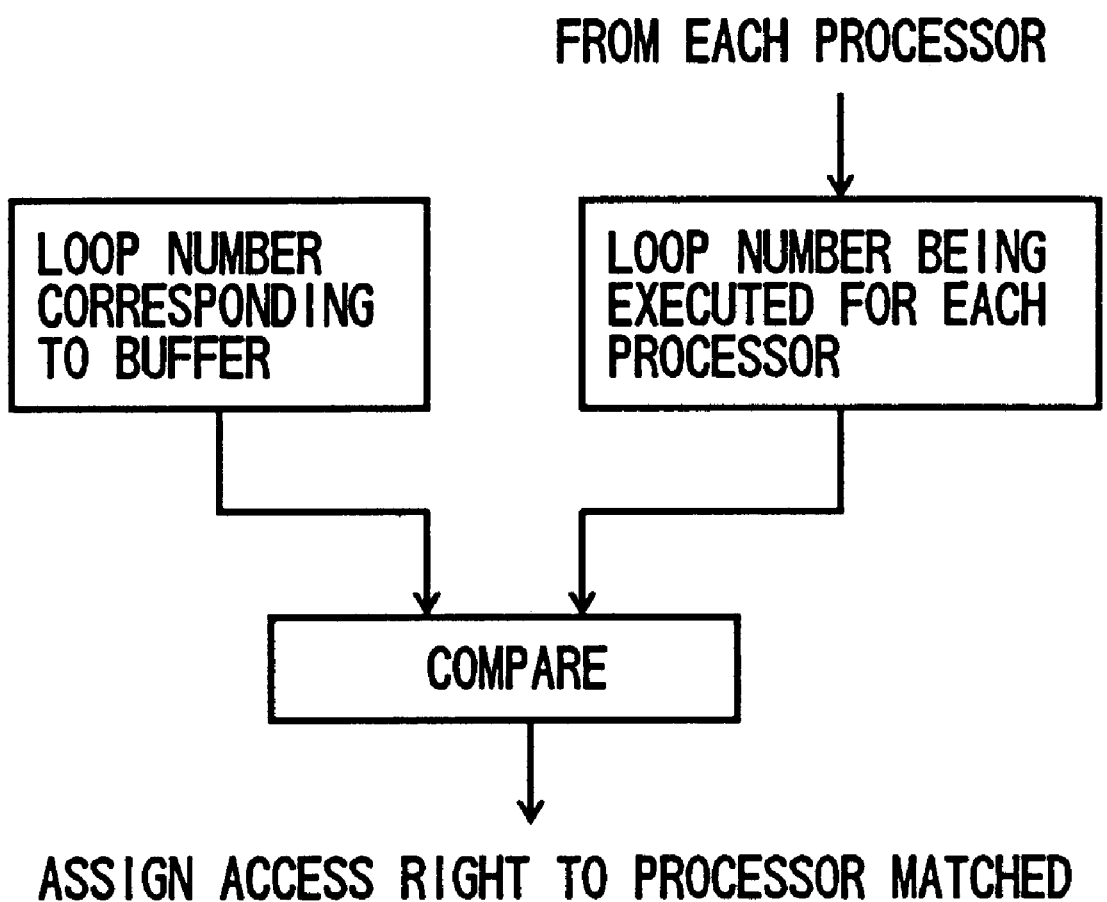
FIG. 16 shows an operation of the loop control block employed in FIG. 15.

As shown in FIG. 16, the multiprocessor system shown in FIG. 15 compares, in the loop snooping circuit 71, the loop number associated with the data in the buffer 8 with the loop number in progress in each processor. Then, the right to access the buffer 8 is given to the processor in which the loop numbers match in the comparing operation. Hence, it is possible to efficiently avoid a collision in use of the bus between the processors.

FIG. 17 is a block diagram of yet another multiprocessor system according to the present invention. In FIG. 17, parts that are the same as those shown in the previously described figures are given the same reference numbers.

The multiprocessor system shown in FIG. 17 includes the master processor 1, the slave processors 2–4, the instruction memory 6, the data memory 7, a buffer 9 and a loop control block 5b equipped with a loop snooping circuit 81. The buffer 9 is provided to commonly use the data memory space by the processors when the processors execute the respective loops of the loop processes of the loop program in parallel. The loop snooping circuit 71 monitors for which loop of the loop process the data input to the buffer 9 from the data memory 7 is used and monitors which loop of the loop process each processor is executing.

When the data is commonly used by the processors and an identical data address is generated by two or three processors, the right to access the buffer 9 is serially given to the processors in an increasing order of the loop number, as shown in FIG. 18. Hence, it is possible to efficiently avoid a collision in use of the bus between the processors.

The present invention is not limited to the specifically disclosed embodiments, and variations and modifications may be made without departing from the scope of the present invention.

What is claimed is:

1. A loop program control device adapted to a multiprocessor system having a master processor and slave processors, the loop program control device comprising:
   a leading address detection unit detecting a leading address of a loop program when the master processor executes the loop program;
   a detection unit detecting a total number of loops of a loop process defined by a loop instruction included in the loop program that should be executed;
   a first notification unit notifying the processors of the leading address detected by the leading address detection unit;
   a second notification unit notifying each of the processors of information indicating which loops of the loop process should be executed;
   a snooping unit which monitors whether the master and slave processors can execute the loop instruction in parallel; and
   a loop count unit which counts up or down, each time the second notification unit notifies one of the processors of the information, a count value which is related to a number of loops of the loop process that have been executed.

2. A multiprocessor system, comprising:
   processors executing loops of a loop process defined by a loop instruction included in a loop program, each of the processors comprising an addressing unit generating a data address with which data can be read from a memory during execution of the loop instruction, said data address including information indicative of which loops of the loop process defined by the loop instruction should be executed;
   a loop program control device controlling the same number of processors as a number of loops of the loop processor that should be executed so that the same number of processors executes the respective loops in parallel; and
   the loop program control device further comprising:
       a leading address detection unit detecting a leading address of the loop program when one of the processors serving as a master processor executes the loop program,
   a detection unit detecting a total number of loops of the loop process that should be executed,
       a first notification unit notifying the processors including processors serving as slave processors of the leading address detected by the leading address detection unit,
       a second notification unit notifying each of the processors of information indicating which loop of the loop process should be executed,
       a snooping unit monitoring whether the master and slave processors can execute the loop instruction in parallel, and
       a loop count unit counting up or down, each time the second notification unit notifies one of the processors of the information, a count value which is related to a number of loops of the loop process that have been executed.

3. The multiprocessor system as claimed in claim 2, wherein each of the processors comprises an addressing unit generating a data address with which data can be read from a memory during execution of the loop instruction, said data address including information indicative of which loop of the loop process defined by the loop instruction should be executed.

4. The multiprocessor system as claimed in claim 2, wherein each of the processors comprises:

an addressing unit generating a data address with which data can be read from a memory during execution of the loop instruction, said data address including information indicative of which loop of the loop process defined by the loop instruction should be executed; and an increment unit automatically updating the information after the loop is executed, the updated information forming part of the data address so that a next data address can be generated.

5. The multiprocessor system as claimed in claim 4, wherein:

the updated information indicates the number of loops of the loop process that have been executed;

the processor further comprises a comparator unit which determines whether the number of loops indicated by the updated information exceeds a given number of loops; and the loop process continues to be executed until the number of loops indicated by the updated information exceeds the given number of loops.

6. The multiprocessor system as claimed in claim 2, wherein when a specific one of the processors recognizes the loop instruction while executing the loop program, the processors including said specific one of the processors execute the loops of the loop process defined by the loop instruction.

7. A multiprocessor system, comprising:

processors executing loops of a loop process defined by a loop instruction included in a loop program, each of the processors comprising an addressing unit which generates a data address with which data can be read from a memory during execution of the loop instruction, said data address including information indicative of which loops of the loop process defined by the loop instruction should be executed;

a loop program control device controlling a common number of processors as a number of loops of the loop process that should be executed so that the common number of processors execute the respective, common number loops in parallel;

a buffer having a memory space accessed by the processors when the processors execute the loop instruction in parallel;

a snooping unit monitoring which loop of the loop process uses data input to the buffer from the memory and monitors which loop of the loop process is being executed for each of the processors, a processor executing the loop of the loop process which uses the data in the buffer being assigned a right to access the buffer; and the loop program control device further comprising:

a leading address detection unit detecting a leading address of the loop program when one of the processors serving as a master processor executes the loop program, a detection unit detecting a total number of loops of the loop process that should be executed, a first notification unit notifying the processors including processors serving as a slave processors of the leading address detected by the leading address detection unit, and a second notification unit notifying each of the processors of information indicating which loop of the loop process should be executed.

8. The multiprocessor system as claimed in claim 7, wherein each of the processors comprises an addressing unit which generates a data address with which data can be read from a memory during execution of the loop instruction, said data address including information indicative of which loop of the loop process defined by the loop instruction should be executed.

9. The multiprocessor system as claimed in claim 7, wherein each of the processors comprises:

an addressing unit which generates a data address with which data can be read from a memory during execution of the loop instruction, said data address including information indicative of which loop of the loop process defined by the loop instruction should be executed; and an increment unit which automatically updates the information after the loop is executed, the updated information forming part of the data address so that a next data address can be generated.

10. The multiprocessor system as claimed in claim 7, wherein:

the updated information indicates the number of loops of the loop process that have been executed;

the processor further comprises a comparator unit which determines whether the number of loops indicated by the updated information exceeds given number of loops; and the loop process continues to be executed until the number of loops indicated by the updated information exceeds the given number of loops.

11. The multiprocessor system as claimed in claim 7, wherein when a specific one of the processors recognizes the loop instruction while executing the loop program, the processors execute the loops of the loop process defined by the loop instruction.

12. A multiprocessor system comprising:

processors capable of executing loops of a loop process defined by a loop instruction included in a loop program, each of the processors comprising an addressing unit which generates a data address with which data can be read from a memory during execution of the loop instruction, said data address including information indicative of which loops of the loop process defined by the loop instruction should be executed;

a loop program control device which controls a common number of processors as a number of loops of the loop process that should be executed so that the common number of processors execute the respective, common loops in parallel;

a buffer having a memory space accessed by the processors when the processors execute the loop instruction in parallel;

a snooping which monitors which loop of the loop process is being executed for each of the processors, a right to access the buffer being serially given to the processors in the increasing order of loop numbers of the loops of the loop process which are being executed when the processors commonly use the data stored in the buffer and generate an identical data address; and the loop program control device further comprising:
- a leading address detection unit detecting a leading address of the loop program when one of the processors servicing as a master processor executes the loop program,
- a detection unit detecting a total number of loops of the loop process that should be executed,
- a first notification unit notifying the processors including processors serving as slave processors of the leading address detected by the leading address detection unit, and
- a second notification unit notifying each of the processors of information indicating which loop of the loop process should be executed.

13. The multiprocessor system as claimed in claim 12, wherein each of the processors comprises an addressing unit which generates a data address with which data can be read from a memory during execution of the loop instruction, said data address including information indicative of which loop of the loop process defined by the loop instruction should be executed.

14. The multiprocessor system as claimed in claim 12, wherein each of the processors comprises:
- an addressing unit which generates a data address by which data can be read from a memory during execution of the loop instruction, said data address including information indicative of which loop of the loop process defined by the loop instruction should be executed; and
- an increment unit which automatically updates the information after the loop is executed, the update information forming part of the data address so that a next data address can been generated.

15. The multiprocessor system as claimed in claim 12, wherein:
- the updated information indicates the number of loops of the loop process that have been executed;
- the processor further comprises a comparator unit which determines whether the number of loops indicated by the updated information exceeds given number of loops; and
- the loop process continues to be executed until the number of loops indicated by the updated information exceeds the given number of loops.

16. The multiprocessor system as claimed in claim 12, wherein when a specific one of the processors recognizes the loop instruction while executing the loop program, the processors execute the loops of the loop process defined by the loop instruction.

* * * * *